United States Patent
Zhou et al.

(10) Patent No.: US 12,225,026 B1
(45) Date of Patent: Feb. 11, 2025

(54) DETECTING MALICIOUS ACTIVITY USING USER-SPECIFIC PARAMETERS

(71) Applicant: Citibank, N.A., New York, NY (US)

(72) Inventors: Rongrong Zhou, Washington, DC (US); Ganesh Babu Gopal, Coppell, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/914,035

(22) Filed: Oct. 11, 2024

Related U.S. Application Data

(63) Continuation-in-part of application No. 18/374,906, filed on Sep. 29, 2023.

(51) Int. Cl.
   *H04L 9/40* (2022.01)
(52) U.S. Cl.
   CPC ................. *H04L 63/1416* (2013.01)
(58) Field of Classification Search
   CPC .................................................. H04L 63/1416
   USPC .......................................................... 726/23
   See application file for complete search history.

(56) References Cited

U.S. PATENT DOCUMENTS

| | | | | |
|---|---|---|---|---|
| 8,595,834 B2 * | 11/2013 | Xie | ............ | G06F 21/566 726/22 |
| 11,153,332 B2 * | 10/2021 | Dichiu | ............ | H04L 63/1416 |
| 2017/0076089 A1 * | 3/2017 | Turgeman | ............ | G06F 3/04812 |
| 2018/0349583 A1 * | 12/2018 | Turgeman | ............ | H04L 63/0861 |
| 2020/0285737 A1 * | 9/2020 | Kraus | ............ | G06F 21/552 |
| 2022/0058660 A1 * | 2/2022 | Ivanov | ............ | G06F 21/554 |
| 2023/0164158 A1 * | 5/2023 | Fellows | ............ | H04L 63/1441 726/23 |
| 2023/0275905 A1 * | 8/2023 | Yarabolu | ............ | H04L 63/1425 726/4 |
| 2023/0319088 A1 * | 10/2023 | Chesla | ............ | H04L 63/1416 726/23 |
| 2024/0323208 A1 * | 9/2024 | Divakaran | ............ | H04L 63/1425 |

\* cited by examiner

*Primary Examiner* — Badri Narayanan Champakesan
*Assistant Examiner* — Badri Champakesan
(74) *Attorney, Agent, or Firm* — Perkins Coie LLP

(57) ABSTRACT

Methods and descriptions are described herein for using user-specific parameters to detect malicious activity in an interaction by a user. In particular, the system may receive user action data representing user actions for users relative to applications. The system may generate, using first user action data representing first user actions of a first user, parameters specific to the first user for determining whether interactions of the first user represent malicious activity. The system may receive, for the first user, a request for a pending interaction with a particular application. The system may then use a first user model trained on the first user action data to identify a set of parameters for identifying the malicious activity. The system may validate the request, in real time, by using the set of parameters to generate a likelihood that the request represents malicious activity.

17 Claims, 3 Drawing Sheets

DETECTING MALICIOUS ACTIVITY USING USER-SPECIFIC PARAMETERS

CROSS-REFERENCE TO RELATED APPLICATIONS

This application is a continuation-in-part of U.S. patent application Ser. No. 18/374,906 filed Sep. 29, 2023. The content of the foregoing application is incorporated herein in its entirety by reference.

SUMMARY

Attempting to create a system/process to detect malicious activity in view of the available conventional approaches created significant technological uncertainty. Creating such platform/system/process required addressing several unknowns in conventional approaches to detection of malicious activity, such as drastic variations in typical user activities between users. Such variations make it difficult to differentiate malicious activity from normal user activity. As such, conventional approaches did not adequately detect malicious activity.

Conventional approaches rely on the application of generic rules for malicious activity detection to user activities, which do not capture malicious activity optimally for each user. For example, a conventional system may apply a rule to all user activities that is overinclusive of malicious activity for a first user and underinclusive of malicious activity for a second user and may fail to provide useful malicious activity detection to either user. Conventional approaches typically involve generic malicious activity detection rules, such as activity limits or geographical radiuses applied to user activity, which do not account for drastic variations in typical user activities between users. Conversely, the disclosed system predicts which user-specific parameters to apply to a user's activities in order to most accurately detect malicious activity for that user.

Additionally, inconsistent user activity by each individual user created further technological uncertainty, as the application of generic rules also cannot account for drastic activity variations in activity by a particular user. Conventional systems may apply generic rules that flag non-malicious activity by a user as malicious activity. To effectively detect malicious activity, inconsistencies in activity by each particular user must be taken into consideration.

To overcome the technological uncertainties, the inventors systematically evaluated multiple design alternatives. For example, the inventors experimented with user-specific parameters for each user. The inventors applied the user-specific parameters to pending interactions by each user, which allowed the inventors to fine-tune the detection of malicious activity to each user. The use of user-specific parameters alone proved to be insufficient, as it failed to account for inconsistencies in user activity by each particular user. Thus, the inventors experimented with different methods for generating and selecting parameters for malicious activity detection to identify the most efficient and effective approaches. Additionally, the inventors systematically evaluated different strategies for selecting certain user-specific parameters, based on a pending interaction, that are more likely to accurately detect malicious activity. The inventors evaluated, for example, different methods of using user models trained for individual users based on corresponding user actions of individual users in order to select the most effective parameters for a given interaction. As such, the inventors accounted for inconsistencies in activity by each particular user.

Methods and systems described herein may detect malicious activity using user-specific parameters that may be generated, for example, using machine learning based on user history data and other user information collected by the system. In some embodiments, the system may receive user action data representing user actions for users relative to applications. The system may generate, using first user action data representing first user actions of a first user, parameters specific to the first user for determining whether interactions of the first user represent malicious activity. The system may receive, for the first user, a request for a pending interaction with a particular application. The system may then use a first user model trained on the first user action data to identify a set of parameters for identifying the malicious activity. The system may validate the request, in real time, by using the set of parameters to generate a likelihood that the request represents malicious activity.

In particular, the system may receive user action data representing user actions for a plurality of users relative to a plurality of applications. For example, the user action data may involve a history or log of interactions performed by each user. The user actions may relate to other users, organizations, or other entities. In some embodiments, each user may be associated with corresponding user actions. In some embodiments, the system may extract, from the user action data, first user action data representing first user actions of a first user. The system may use the first user action data to generate parameters specific to the first user.

In some embodiments, the system may generate parameters specific to the first user for determining whether interactions of the first user represent malicious activity. For example, the system may generate the parameters using the first user action data and without using other user action data representing other user actions for other users. In some embodiments, the system may generate the parameters by inputting, into a parameter generating machine learning model, the first user action data. For example, the machine learning model is trained to generate user-specific parameters based on user action data relating to a particular user. Inputting the first user action data into the machine learning model may cause the model to generate the parameters specific to the first user. As an example, for a given interaction occurring geographically distant from the first user's typical activities, the first user model may predict that a parameter relating to geographical areas of the first user may be most effective. The first user model may therefore output a parameter identifier identifying the corresponding geographic parameter associated with the first user. As such, the system generates parameters that are specific to the first user and based on the pending interaction. In some embodiments, each parameter may include an identifier and a corresponding parameter value. For example, a first parameter for the first user may identify certain types of interactions having corresponding values above a certain amount, where the amount is specific to the first user. A second parameter for the first user may identify certain types of interactions occurring more than a certain distance from the home of the first user.

In some embodiments, the system may receive, for the first user, a request for a pending interaction with a particular application. For example, the system may receive an indication that the first user attempted to perform an interaction with the particular application, and the system must determine whether the pending interaction is malicious or legitimate. In some embodiments, the system may use a first user model to select which of the user-specific parameters for the first user are most effective at detecting malicious activity for the pending interaction. In some embodiments, the first user model may be trained for the first user using the first user action data and without using the other user action data. The system may input, into the first user model, the pending interaction to cause the first user model to generate parameter identifiers identifying a set of parameters. For example, the set of parameters may be more likely than another set of parameters to identify the malicious activity in the pending interaction. As an illustrative example, the first user model may identify a parameter that detects malicious activity for the first user when transactions occur more than 1,000 miles from any prior interactions the first user performed within the last 24 hours.

In some embodiments, the system may perform, in real time while the interaction is pending, a comparison between parameter values associated with the set of parameters and interaction values associated with the pending interaction. For example, the system may compare a value associated with the pending interaction with values associated with the set of parameters. As an example, the system may compare the parameter value (e.g., 1,000 miles) to the distances between locations of the first user's prior transactions within the past 24 hours and the location of the pending interaction. The system may generate an output indicating a likelihood that the request represents the malicious activity based on the comparison. For example, the system may detect malicious activity based on a determination that the pending interaction occurred more than 1,000 miles from any locations of the first user's prior transactions within the past 24 hours. In some embodiments, the system may generate the output indicating the likelihood in real time during the pendency of the pending interaction.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which.

Figure 1:
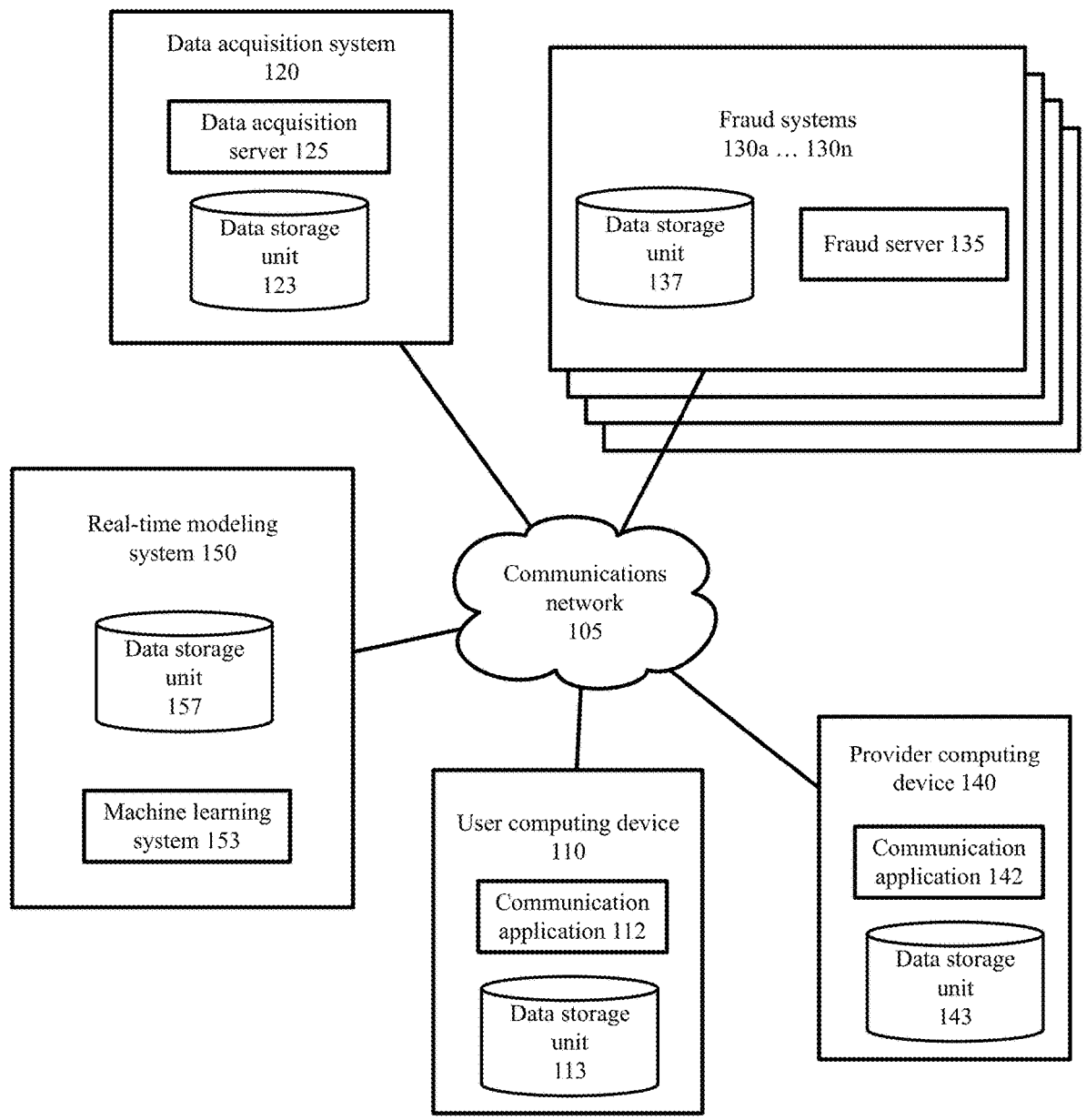
FIG. 1-A block diagram depicting a portion of a communications and processing architecture of a typical system to provide real-time fraud analysis based on aggregated data collected from multiple sources associated with a user lifecycle.

The figures herein are for illustrative purposes only and are not necessarily drawn to scale. These and other aspects, objects, features, and advantages of the example embodiments will become apparent to those having ordinary skill in the art upon consideration of the following detailed description of example embodiments.

DETAILED DESCRIPTION

Methods and systems described herein may detect malicious activity using user-specific parameters. In some embodiments, the system may receive user action data representing user actions for users relative to applications. The system may generate, using first user action data representing first user actions of a first user, parameters specific to the first user for determining whether interactions of the first user represent malicious activity. The system may receive, for the first user, a request for a pending interaction with a particular application. The system may then use a first user model trained on the first user action data to identify a set of parameters for identifying the malicious activity. The system may validate the request, in real time, by using the set of parameters to generate a likelihood that the request represents malicious activity.

As an illustrative example, the system may receive a history of user actions including transactions or other interactions between users and applications. For example, the history of user actions may be a log of transactions involving the users. The system may identify interactions involving a first user and may use those interactions to generate parameters specific to the first user. The parameters may be rules that are specific to the first user. For example, the rules may be based on the first user's transacting habits, geographic locations, or other factors specific to the first user. The system may then select certain user-specific rules to apply to certain pending interactions by the first user. For example, if the first user initiates a transaction, the system may use a model trained on the first user's history to select which parameters to apply. The model may, for example, select a parameter that detects malicious activity based on geographic location for a pending interaction occurring outside the first user's typical geographic locations. In some embodiments, the system may apply multiple parameters to the pending interaction. If the pending interaction satisfies one or more selected parameters, the system may determine that the pending interaction involves malicious activity. As such, the system may reject the pending interaction or transmit a notification of malicious activity.

In particular, the system may receive user action data representing user actions for users relative to applications. For example, the user action data may involve a history or log of interactions performed by each user. User action data may include actions such as clicks, searches, navigation patterns, interactions, and time spent on specific pages or features. The user action data may also encompass demographic information, preferences, device usage, or how users move through different stages of an interaction process. In some embodiments, the user actions may relate to other users, organizations, or other entities. The user action data may capture the various activities and behaviors that users exhibit when interacting with a system, platform, or application.

In some embodiments, each user may be associated with corresponding user actions. In some embodiments, the system may extract, from the user action data, first user action data representing first user actions of a first user of the plurality of users. Extracting user action data for the first user may involve filtering using identifiers. Each user may have a unique identifier, such as a user ID, email, or session token, which may be used to isolate user action data associated with that user within the broader dataset. By querying the dataset with a particular identifier, the system may extract all records associated with that particular user, including their interactions and other actions. In some embodiments, time stamps, device types, and geographical information may be used to ensure that the data extracted is accurate and complete.

In some embodiments, the system may generate parameters specific to the first user. The parameters may enable the system to determine whether interactions of the first user represent malicious activity. For example, the system may generate the parameters using the first user action data and without using other user action data representing other user actions for other users. As such, the system generates parameters that are specific to the first user. In some embodiments, the parameters may include conditional statements, criteria, or thresholds used to identify behaviors or patterns that deviate from normal actions by a particular user. These parameters can be based on historical data, such as the typical interaction habits of an individual, geographic locations where activities normally occur, or the frequency of certain actions within a defined timeframe. When activities exceed these predefined limits-such as an unusually high number of interactions within a short period or interactions in locations outside the user's typical range—these deviations may cause the system to detect malicious activity.

In some embodiments, each parameter may include an identifier and a corresponding parameter value. For example, a first parameter for the first user may identify certain types of interactions having corresponding values above a certain amount. Parameters may include activity size thresholds, such that any action exceeding a certain limit violates the parameter. Parameters may include geographical location, such that actions occurring in areas outside a person's usual locations violate the parameter. The frequency of actions, such as an unusually high number of events within a short time frame, may violate a parameter. Additionally, activities happening at odd hours, actions from unfamiliar devices IP address changes, or significant shifts in the types of actions performed may violate various parameters.

In some embodiments, the system may input, into a parameter generating machine learning model, the first user action data. In some embodiments, the machine learning model is trained to generate user-specific parameters based on user action data relating to a particular user. Inputting the first user action data into the machine learning model may cause the model to generate the parameters specific to the first user. For example, a parameter relating to activity size may be generated based on sizes typically associated with the first user's activities. Another parameter relating to geographical location may be generated in relation to geographical locations of the user's typical activities. In some embodiments, a parameter relating to frequency of user actions may be generated based on a typical frequency of actions by the first user. In some embodiments, the machine learning model may generate other types of parameters relating to the first user. The system may then receive, from the machine learning model, the user-specific parameters.

The system may store the user-specific parameters for the first user. In some embodiments, the system may periodically update the user-specific parameters for the first user based on new user action data for the first user (e.g., as the first user performs more actions). In some embodiments, the system may store the user-specific parameters in parameter storage. For example, the parameter storage may store the parameters specific to the first user. In some embodiments, the same parameter storage or a separate parameter storage may store other parameters associated with other users.

In some embodiments, the system may receive, for the first user, a request for a pending interaction with a particular application. For example, the system may receive an indication that the first user attempted to perform an interaction with the particular application. As an illustrative example, the first user may initiate a transaction with a platform, and the system must determine whether the pending interaction is malicious or legitimate. In some embodiments, the system may use a first user model to select which of the user-specific parameters for the first user will be most effective at detecting malicious activity for the pending interaction. In some embodiments, the first user model may be trained for the first user using the first user action data and without using the other user action data. For example, the system may determine that the first user model corresponds to the first user. The system may then provide, to the first user model, the first user action data without providing the other user action data to train the first user model to generate parameter identifiers identifying sets of parameters for the first user based on pending interactions. The first user model may thus model or predict first user actions that the first user may perform.

The first user model may be used to predict which of the user-specific parameters generated for the first user will be most effective at detecting fraud in a pending interaction. The system may input, into the first user model, the pending interaction received by the system. This may cause the first user model to generate parameter identifiers identifying a set of parameters. In some embodiments, the set of parameters may be more likely than another set of parameters to identify the malicious activity in the pending interaction. For example, the first user model may predict, based on the user action data associated with the first user, which attributes of the pending interaction may be indicative of malicious activity. As an illustrative example, for a given interaction occurring geographically distant from the first user's typical activities, the first user model may predict that a parameter relating to geographical areas of the first user may be most effective. The first user model may therefore output a parameter identifier identifying the corresponding geographic parameter associated with the first user. For example, the identified parameter may identify malicious activity for pending interactions occurring more than 1,000 miles from any prior interactions the first user performed within the last 24 hours. The system may thus identify parameters based on the identifiers output by the first user model.

In some embodiments, upon receiving, from the first user model, the parameter identifiers identifying the set of parameters, the system may extract the set of parameters from storage using the parameter identifiers. For example, the set of parameters may be a subset of the user-specific parameters associated with the first user. In some embodiments, the parameter storage stores the parameters specific to the first user and other parameters associated with other users.

In some embodiments, the system may perform, in real time during pendency of the pending interaction, a comparison between parameter values associated with the set of parameters and interaction values associated with the pending interaction. For example, the system may compare a value associated with the pending interaction with values associated with the set of parameters. As an illustrative example, the system may compare a geographical distance relating to the pending interaction with a geographical distance relating to a parameter of the set of parameters. The system may generate an output indicating a likelihood that the request represents the malicious activity based on the comparison. For example, the system may detect malicious activity based on a determination that a geographical distance associated with the pending interaction exceeds one or more values associated with the set of parameters. In particular, the system may determine, for the set of parameters, a corresponding set of interaction parameters. For example, the corresponding set of interaction parameters may be extracted from the pending interaction that is received as part of the request. As an illustrative example, interaction parameters may include values, geographical distances, or other attributes associated with the pending interaction.

The system may then determine whether the corresponding set of interaction parameters matches the set of parameters. For example, a match can include an interaction parameter value equaling a value associated with the set of parameters. A match may include an interaction parameter value being equal to or greater than a value associated with the set of parameters. As an illustrative example, a pending interaction having a value of 540 may match the set of parameters if a parameter includes a threshold of 500. A match may include an interaction parameter value being equal to or less than a value associated with the set of parameters. As an illustrative example, a pending interaction having a distance of 8.1 may match the set of parameters if a parameter includes a threshold of 10.7. In some embodiments, the pending interaction may match the set of parameters if any values associated with the pending interaction match with any of the parameters within the set of parameters. In some embodiments, the pending interaction may match the set of parameters if any values associated with the pending interaction match with two or more of the parameters within the set of parameters. In some embodiments, the pending interaction may match the set of parameters if any values associated with the pending interaction match with one specific parameter within the set of parameters. In some embodiments, the pending interaction may match the set of parameters if any values associated with the pending interaction match with two specific parameters within the set of parameters, and so on.

In some embodiments, the system may determine that a number of parameters within the set of parameters matches the corresponding set of interaction parameters. The system may determine a ratio of the number of parameters that matches the corresponding set of interaction parameters to a total number of parameters of the set of parameters. For example, out of ten parameters in the set of parameters, there may be six parameters matching the pending interaction. The ratio may therefore be ⅗. The system may compare this ratio to a threshold ratio. For example, the threshold ratio may be predetermined. In some embodiments, the threshold ratio may be modified to adjust the sensitivity of the malicious activity detection system. For example, the ratio may be decreased in order to capture more potential malicious activities or decreased to avoid capturing activities that are not malicious. In this example, the threshold ratio may be ¼. The system may compare the ratio to the threshold ratio and, in this case, may determine that the ratio satisfies the threshold ratio. Based on determining that the ratio satisfies the threshold ratio, the system may determine that the pending interaction is malicious.

The system may determine that the pending interaction matches the set of parameters using the above techniques or a combination of techniques. Based on determining that the pending interaction matches the set of parameters, the system may determine that the pending interaction is malicious. In some embodiments, the system may determine that the pending interaction does not match the set of parameters and may thus determine that the pending interaction is not malicious.

In some embodiments, the system may validate the request. Validating the request may involve generating an output indicating a likelihood that the pending interaction is malicious. In some embodiments, the system may output the likelihood in real time during the pendency of the pending interaction. In some embodiments, the system may reject the pending interaction based on determining that the pending interaction is malicious. In some embodiments, the system may issue an alert, notify the first user, or transmit an indication of malicious activity to another system based on determining that the pending interaction is malicious. In some embodiments, the system may approve the pending interaction based on determining that the pending interaction is malicious.

In some embodiments, the system may generate and select different user-specific parameters for a different user. For example, the user may extract, from the user action data, second user action data representing second user actions of a second user. The system may generate, using the parameter generating machine learning model with the second user action data, new parameters specific to the second user for determining whether interactions of the second user represent new malicious activity. For example, the new parameters may be different from the parameters generated for the first user. The new parameters may involve different criteria, values, or other attributes based on the user action data of the second user. The system may receive, for the second user, a new request for a new pending interaction with an application. The system may then input the pending interaction into a second user model. For example, the second user model may be trained for the second user using the second user action data and without using the other user action data. In some embodiments, this may cause the second user model to generate new parameter identifiers identifying a new set of parameters within the parameters specific to the second user. In some embodiments, the new set of parameters may be a subset of the user-specific parameters for the second user, where the subset is determined based on the new pending interaction by the second user. The system may then perform, in real time during pendency of the new pending interaction, a new comparison between corresponding parameter values associated with the new set of parameters and new interaction values associated with the new pending interaction. The system may then generate, based on the new comparison and in real time during the pendency of the new pending interaction, a new output indicating a new likelihood that the new request represents the new malicious activity. In some embodiments, the system may perform this method for each user to generate user-specific parameters for each user and select certain parameters to determine whether each pending interaction by that user is malicious.

OTHER EMBODIMENTS

Conventional systems manage user interactions in many different types of applications. Some applications provide users with access to digital or real-world environments. Other systems manage user accounts for applications such as social media accounts or customer accounts. Other applications may provide access to user accounts with an insurance company, a government services provider, or a university or school. These conventional systems are subject to fraudulent actions by the user or fraudulent actors posing as the user.

The conventional systems are often unable to identify fraudulent actions in user accounts because conventional systems do not have access to a sufficient quantity of relevant user data quickly enough for the data to be useful. The static application of existing, configured rules to identify fraud are incapable of reacting to the everchanging fraudulent techniques. Conventional systems are unable to compile and analyze data across multiple applications. The data from multiple applications is often stored in separate siloed data storage locations that are unable to be aggregated or compiled.

Further, conventional systems configure fraud detection rules based on human assessments of a small quantity of user data obtained from previous detection of fraudulent actions. For example, when fraudulent actors use a particular technique to access a user account, an operator may configure a single rule that addresses this observed fraudulent technique. However, human-based systems are unable to capture vast amounts of data, such as the data of every user utilizing a particular payment instrument. Unlike a machine learning system or artificial intelligence system, systems that rely on humans are unable to draw the subtle conclusions required to identify users that are performing potentially fraudulent actions before the interactions are complete and before the particular technique is observed, identified, and labeled as fraudulent. Human systems are unable to use machine learning algorithms to analyze sufficient data to select a palette of rules to apply to incoming data to identify and prevent fraudulent actions.

The embodiments disclosed herein provide a platform that collects data associated with a user from multiple siloed account providers, service providers, or other interactive applications. In an example, the system processes the received data from the sources and stores aggregated data in a single format in a single database or other storage system accessible by a single data processor. The collection of data allows the system to have an overview of user interactions and user data across different interactive applications that use different formats.

The system applies one or more machine learning algorithms to the aggregated data to identify similarities, trends, outliers, and other data characteristics. Based on the analysis, one or more rule sets may be developed to identify potentially fraudulent interactions. When the user attempts a new interaction with one or more of the interactive applications, the data from the interaction is received by the system.

The system processes the data from the new interaction and selects a set of rules to apply to the interaction to identify a likelihood that the interaction is fraudulent, such as a rating, score, percentage, or other measure of the likelihood. The system may use one or more machine learning algorithms to select a rule or a combination of rules to apply to the interaction to identify any potentially fraudulent components of the interaction. The set of rules may cause the system to compare the pending interaction with data from the other stored user data from other applications utilized in the user journey to determine if the pending interaction creates a conflict or represents an outlier. Having all the user data stored in the single database or storage location allows the system to identify fraudulent activities that are not identifiable with conventional systems.

The system's ability to use machine learning algorithms to mix-and-match, blend, or combine sets of rules to identify fraudulent activities allows the system to be scaled up when adding new interaction applications, new users, and/or new data. As the applications change or develop, the system retains the ability to craft a kit of fraud rules for each user interaction. Upon identification of the potential fraud, the system may deny the interaction and/or provide a notification to the application, a fraud investigator, or any other suitable person or application. The potential fraud may be further used to train the one or more machine learning algorithms. This feedback loop based on newly discovered fraud helps train the algorithms to identify new fraud techniques.

In certain examples, the machine learning systems use interaction data from internal data from an institution or entity with which the user is interacting. For example, the internal data may include data from customer applications managed by the institution, user interactions with different business units of the institution, user authentication or authorization data from interactions with the institution, user interactions with other users occurring on an application or function of the institution, or any other associated data logged from the user. The data may include all of these interactions of all of the users or customers of the institution.

In other examples, external data may be used. The machine learning systems may use interaction data from a vast number of users of applications of institutions, such as social media companies, universities, financial institutions, governments, insurance companies, and other third party and internal data to create models that can identify trends and commonalities that may be indicative of fraudulent activities. Because of the immense amount of data that is acquired, processed, and categorized from internal data and/or external data, any number of human users would be unable to create the analyses, select the rules, or perform the operations described herein.

The system provides assessments of each user interaction to local fraud systems that are associated with each division, process, or other function of the institution. For example, an authentication process may have a fraud system to identify when a user authentication entry is fraudulent. A separate system that allows user access to secure documents may have a fraud system to identify when a user is requested unauthorized data. A separate system that allows user to conduct transactions may have a fraud system to identify when a user is attempting a fraudulent transaction. Other example systems are described herein.

When the user attempts a pending interaction with one of the functions, the system analyzes the details of the interaction as described herein. The system determines a likelihood of the user interaction being fraudulent and provides a notification of the assessment to the fraud system associated with that function. The fraud system may use the provided assessment in any suitable manner. For example, the fraud system may incorporate the assessment as a data point in determining a final fraud score. In another example, the fraud system may incorporate a recommendation in the assessment when applying a certain rule to the user interaction authentication. In another example, the fraud system may use the fraud likelihood from the system directly as the deciding factor and allow or deny the user interaction based only on the analysis. Any other usages of the notification may be performed, such as others described herein.

This invention represents an advance in computer engineering and a substantial advancement over existing practices. The data acquired to prepare the analyses are technical data relating to interactions, data requests, transactions, geolocations, and other data. The outputs of the machine learning systems are not obtainable by humans or by conventional methods. Identifying trends and commonalities based on this vast amount of data and selecting a kit of rules using machine learning techniques is a non-conventional, technical, real-world output and benefit that is not obtainable with conventional systems.

Example System Architectures

Turning now to the drawings, in which like numerals represent like (but not necessarily identical) elements throughout the figures, example embodiments are described in detail.

FIG. 1 is a block diagram depicting a system 100 to provide real-time fraud analysis based on aggregated data collected from multiple sources associated with a user lifecycle. A user associated with a user computing device 110 installs an application, and or makes a feature selection to obtain the benefits of the techniques described herein.

As depicted in FIG. 1, the system 100 includes network computing devices/systems 110, 120, 130, 140, and 150 that are configured to communicate with one another via one or more networks 105 or via any suitable communication technology.

Each network 105 includes a wired or wireless telecommunication means by which network devices/systems (including devices 110, 120, 130, 140 and 150) can exchange data. For example, each network 105 can include any of those described herein such as the network 2080 described in FIG. 3 or any combination thereof or any other appropriate architecture or system that facilitates the communication of signals and data. Throughout the discussion of example embodiments, the terms "data" and "information" are used interchangeably herein to refer to text, images, audio, video, or any other form of information that can exist in a computer-based environment. The communication technology utilized by the devices/systems 110, 120, 130, 140 and 150 may be similar networks to network 105 or an alternative communication technology.

Each network computing device/system 110, 120, 130, 140 and 150 includes a computing device having a communication module capable of transmitting and receiving data over the network 105 or a similar network. For example, each network device/system 110, 120, 130, 140 and 150 can include any computing machine 2000 described herein and found in FIG. 3 or any other wired or wireless, processor-driven device. In the example embodiment depicted in FIG. 1, the network devices/systems 110, 120, 130, 140 and 150 are operated by users, data acquisition system operators, fraud system operators, provider computing device operators, and/or modeling system operators, respectively.

The user computing device 110 can use the communication application 112, which may be, for example, a web browser, application, or a stand-alone module, to view, download, upload, or otherwise access documents or web pages through a user interface via the network 105. The user computing device 110 can interact with the web servers or other computing devices connected to the network, including the provider computing device 140, the data acquisition server 125 of the data acquisition system 120, and the fraud server 135 of the incentive system 130. In another example embodiment, the user computing device 110 communicates with devices in the data acquisition system 120 and/or the fraud system 130 via any other suitable technology, including the example computing system described below. In an example, the communication application 112 is an application for managing an account of the user at an institution or entity associated with the fraud system 130. For example, the communication application 112 may be used to conduct interactions, manage account settings, submit media posts, file data requests, manage offers, or perform any other suitable tasks associated with a user account or services provided by the provider computing device 140.

The user computing device 110 also includes a data storage unit 113 accessible by the communication application 112, or other applications. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In another example embodiments, the data storage unit 113 may reside in a cloud-based computing system.

An example data acquisition system 120 comprises a data storage unit 123 and an acquisition server 125. The data storage unit 123 can include any local or remote data storage structure accessible to the data acquisition system 120 suitable for storing information. The data storage unit 123 can include one or more tangible computer-readable storage devices, or the data storage unit 123 may be a separate system, such as a different physical or virtual machine or a cloud-based storage service.

In one aspect, the data acquisition server 125 communicates with the user computing device 110, the provider computing device 140, the fraud system 130, and/or any other computing system to acquire data or to transmit requested data. The data may include any suitable data used for any purposes described herein, such as detecting fraud or training a machine learning algorithm.

Example fraud systems 130a through 130n are illustrated. The fraud systems 130a-n may represent any number of fraud systems 130 that are used to identify user fraud for a specific system of an entity. For example, one fraud system 130a may be used to identify users that are attempting to fraudulently sign into an application. Another fraud system 130b may be used to identify users attempting to apply for a payment card. Another fraud system 130c may be used to identify users attempting to conduct a transaction with another user. Any number of fraud systems 130a-n may be envisioned or used. Each fraud system 130a-n comprises a fraud server 135 and a data storage unit 137.

For convenience, only a single fraud server 135 and data storage unit 137 is illustrated, but each fraud system, such as fraud system 130a, fraud system 130b, or fraud system 130c may employ a fraud server 135 and data storage unit 137. The fraud server 135 communicates with the user computing device 110, the data acquisition system 120, and the real-time modeling system 150 to request and receive data, to request fraud analyses, or perform other actions. The data may comprise the data types previously described in reference to the data acquisition server 125 and described herein.

The data storage unit 137 can include any local or remote data storage structure accessible to the fraud system 130a-n suitable for storing information. The data storage unit 137 can include one or more tangible computer-readable storage devices, or the data storage unit 137 may be a separate system, such as a different physical or virtual machine or a cloud-based storage service.

The provider computing device 140 can use the communication application 142 on the provider computing device 140, which may be, for example, a web browser, application, or a stand-alone module, to view, download, upload, or otherwise access documents or web pages through a user interface via the network 105. The provider computing device 140 can interact with the web servers or other computing devices connected to the network, including the user computing device 110, the data acquisition server 125 of the data acquisition system 120, the fraud server 135 of the fraud system 130a-n, and the real-time modeling system 150. In another example embodiment, the provider computing device 140 communicates with devices in the data acquisition system 120, the real-time modeling system 150, and/or the fraud system 130 via any other suitable technology, including the example computing system described below. In an example, the communication application 142 is an application for managing services provided by the provider institution or an entity associated with the real-time modeling system 150. For example, the communication application 142 may be used to conduct interactions with a user, manage account settings, distribute media posts, respond to data requests, manage offers, or perform any other suitable tasks associated with services provided by the provider computing device 140.

The provider computing device 140 also includes a data storage unit 143 accessible by the communication application 142, or other applications. The example data storage unit 143 can include one or more tangible computer-readable storage devices. The data storage unit 143 can be stored on the provider computing device 140 or can be logically coupled to the provider computing device 140. For example, the data storage unit 143 can include on-board flash memory and/or one or more removable memory accounts or removable flash memory. In another example embodiment, the data storage unit 143 may reside in a cloud-based computing system.

The real-time modeling system 150 includes a data storage unit 153 and a machine learning system 153. The real-time modeling system 150 provides a platform to monitor user interactions, create user models, create fraud rules sets, compare pending user interactions, identify a likelihood of fraud for an interaction, or perform any other tasks as described in the methods herein.

The machine learning system 153 receives an input of data from the fraud server 135, the data acquisition server 125, or other suitable source. The machine learning system 153 can comprise one or more functions to implement any of the mentioned training methods described herein. In an example, the machine learning program used by the machine learning system 153 may comprise a support vector machine, a naïve bayes algorithm, a neural network, a random forest algorithm, or any other suitable machine learning algorithm. The suitable machine learning algorithms are discussed in greater detail herein. In other examples, artificial intelligence systems may use processes such as fuzzy logic or complex dependency parsing techniques. Any suitable architecture may be applied to identify potentially fraudulent interactions that is discernable from collected and aggregated user data.

The data storage unit 157 can include any local or remote data storage structure accessible to the real-time modeling system 150 suitable for storing information. The data storage unit 157 can include one or more tangible computer-readable storage devices, or the data storage unit 157 may be a separate system, such as a different physical or virtual machine or a cloud-based storage service.

It will be appreciated that the network connections shown are examples, and other means of establishing a communications link between the computers and devices can be used. Moreover, those having ordinary skill in the art having the benefit of the present disclosure will appreciate that the user computing device 110, data acquisition system 120, the fraud system 130, the provider computing device 140, and the real-time modeling system 150 illustrated in FIG. 1 can have any of several other suitable computer system configurations. For example, a user computing device 110 embodied as a mobile phone or handheld computer may not include all the components described above.

Figure 3:
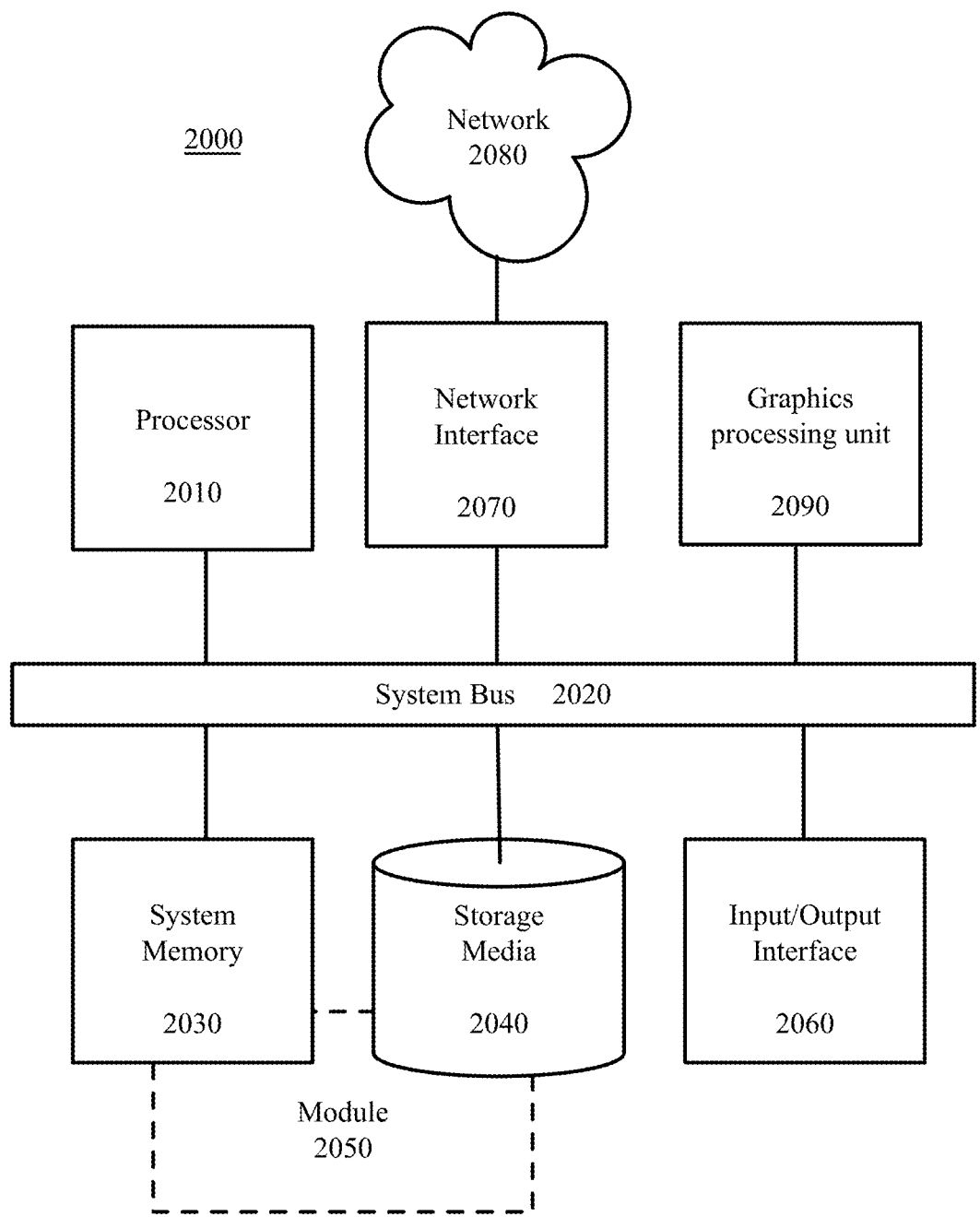
FIG. 3-A block diagram depicting a computing machine and modules.

In example embodiments, the network computing devices and any other computing machines associated with the technology presented herein may be any type of computing machine such as, but not limited to, those discussed in more detail with respect to FIG. 3. Furthermore, any modules associated with any of these computing machines, such as modules described herein or any other modules (scripts, web content, software, firmware, or hardware) associated with the technology presented herein may by any of the modules discussed in more detail with respect to FIG. 3. The computing machines discussed herein may communicate with one another as well as other computer machines or communication systems over one or more networks, such as network 105. The network 105 may include any type of data or communications network, including any of the network technology discussed with respect to FIG. 3.

Example Processes

Figure 2:
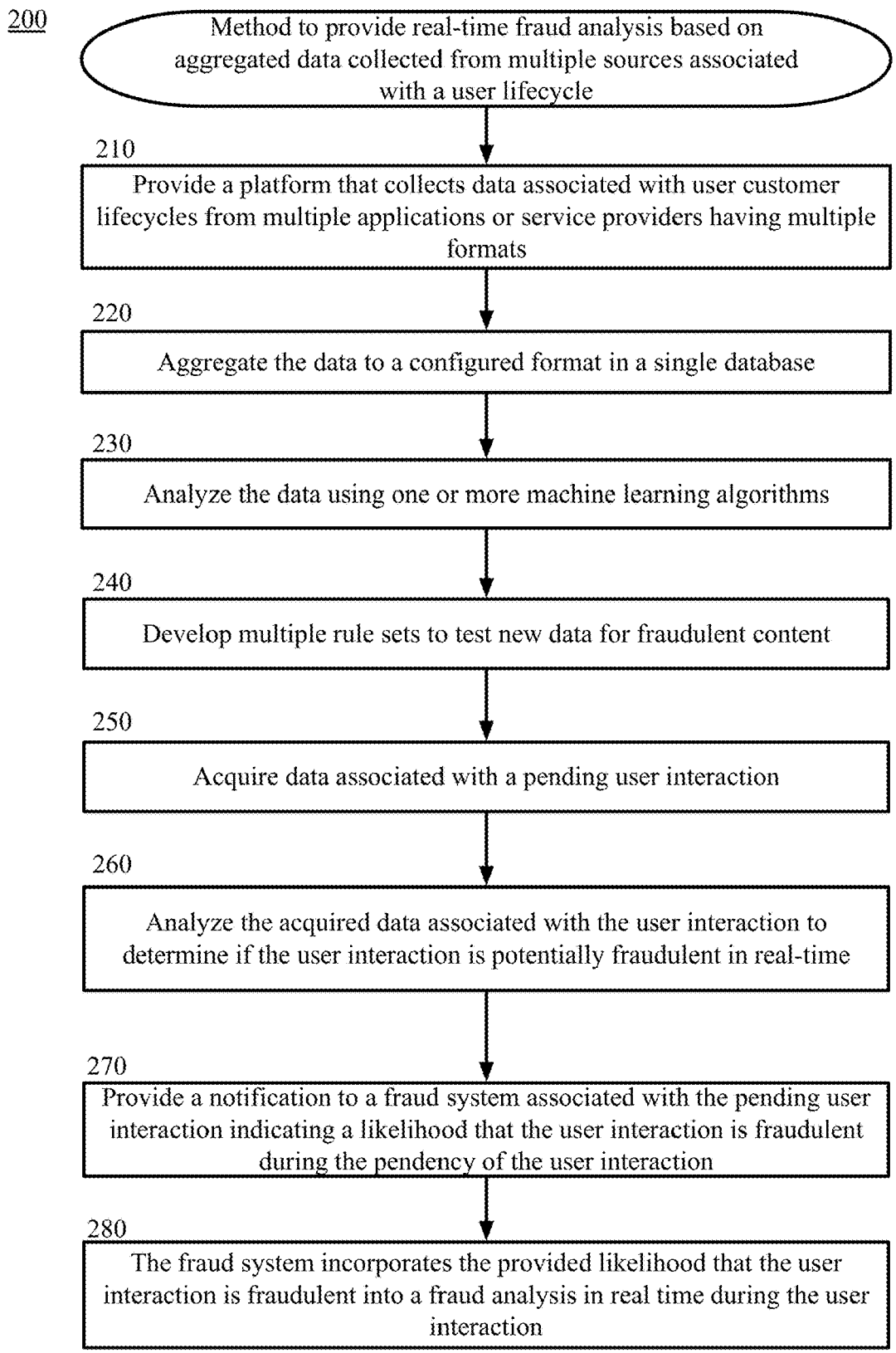
FIG. 2-A block flow diagram depicting methods to provide real-time fraud analysis based on aggregated data collected from multiple sources associated with a user lifecycle.

The example methods illustrated in FIG. 2 are described hereinafter with respect to the components of the example architecture 100. The example methods also can be performed with other systems and in other architectures including similar elements.

Referring to FIG. 2, and continuing to refer to FIG. 1 for context, a block flow diagram illustrates methods 200 to provide real-time fraud analysis based on aggregated data collected from multiple sources associated with a user lifecycle, in accordance with certain examples of the technology disclosed herein.

In block 210, the real-time modeling system 150 provides a platform that collects data associated with user customer lifecycles from multiple applications or service providers having multiple formats. The real-time modeling system 150 may obtain data from a data acquisition system 120, the fraud system 130a-n, or any suitable provider, provider computing device 140, third-party provider, user computing device 110, institution, government agency, merchant, insurance provider, social media platform, or any other suitable database or compiler of user data. The data may include user account management histories, user sign-in attempts, user interactions, account updates, data requests, or any other type of user interactions with applications or services of a provider.

In an example, the data may be collected by the data acquisition system 120 from user interactions with a particular application of a provider computing device 140. For example, the application may be used to conduct interactions between a user and the provider. The application may be downloaded or otherwise displayed on a user interface of the user computing device 110. For example, the application may be an application to manage a user social media account, financial account, insurance account, government service account, utility account, or any other suitable account.

In certain examples, the data may include interactions with an insurance company to pay invoices, report incidents, make a claim, request data, or perform any other interactions. In certain examples, the data may include user histories with a payment instrument associated with a payment instrument institution. The data may include user spending history with other payment instruments associated with other payment instrument institutions. The data may include data from third parties such as credit card acquirers or merchants. The data may include data from all of the users of a payment instrument institution or of a social media network. In practice, this may include millions of users each conducting hundreds of transactions and other interactions.

The data acquisition system 120 may acquire third-party data relating to user and merchant interactions. The third-party data may be related to merchants, merchant transactions, event locations, event times, event durations, ticket purchases, spending histories of users at events or at merchants, geolocation of merchants and events, or any other suitable data.

The third-party data may be acquired from any suitable source, such as credit card acquirers, financial institutions, ticket sale organizations, search engines, information aggregators, social media organizations, news outlets, websites, or any other suitable source.

The data acquisition system 120 acquires internal data related to interactions, ticket purchases, entertainment events such as rock concerts and shows, concentrated shopping mall purchases from multiple stores, hotel reservations, flight information, and restaurant, bar, food and drink purchases.

The data acquisition system 120 may gather geolocation data for the one or more users. The geolocation data may be obtained from a geolocation application on user computing devices 110 or from geolocation data server. For example, the data may be obtained from a cellular phone provider that maintains a database of phone locations. A geolocation application may utilize any suitable system for determining location of the user computing device 110, such as a Global Positioning System, Wi-Fi locations, cellular locations, or any other suitable technology.

In an example, this data may include the geolocation histories of millions of users of a cellular provider. In another example, this data may include all of the tens of thousands of ticket purchases for each of thousands of sporting events in a regional area.

The data acquisition system 120 may acquire this type of data and other related data about the user and any other users. The data acquisition system 120 may acquire any type of data associated with the interactions, such as the date, the time of day, the type of merchant, the type of card used, the incentives provided for each transaction, or any other suitable data.

The data acquisition system 120 may send the collected data to the real-time modeling system 150 or in any way allow the real-time modeling system 150 access to the data. In an example, the data acquisition system 120 may be a function of a platform provided by the real-time modeling system 150. In another example, the real-time modeling system 150 may be a function of a platform provided by the data acquisition system 120. Alternatively, the systems 120, 150 may be functions of another third-party system. In other examples the real-time modeling system 150 performs certain data acquisition functions described herein instead of receiving data from the data acquisition system 120.

The real-time modeling system 150 provides a platform that collects the data from the data acquisition system 120 or from any other suitable source. The data collected may be used to log the passage of a user lifecycle. That is, the platform allows the real-time modeling system 150 to access data that is siloed in different systems using different formats. In conventional systems, the siloed data is difficult to extract from the different sources and store in a single system in a single storage format. The data must be continuously received from the data sources to allow the real-time modeling system 150 to maintain accurate models and algorithms. The data must be received promptly from each data source to ensure that the models and algorithms are based on current user data, trends, patterns, and actions. If the data is not continuously provided and the models updated, then the analysis of fraud will not be able to predict the ever-changing fraudulent practices.

The platform of the real-time modeling system 150 allows the vast quantities of data to be collected into the real-time modeling system 150 quickly. In one example, the real-time modeling system 150 may use a Remote Dictionary Server ("Redis"), which supports different kinds of abstract data structures, such as strings, lists, maps, sets, sorted sets, hyperloglogs, bitmaps, streams, or spatial indices. Because the data may be collected from external data sources, the latency and throughput of those sources can limit the speed and amount of data to be collected, especially as traffic increases or the system attempts to incorporate larger numbers of data sources. A Redis system may allow the real-time modeling system 150 to store and manipulate data in-memory, closer to the application. Redis may allow the real-time modeling system 150 to store data in-memory to deliver fast performance when reading or writing data. The system offers built-in replication capabilities that let the real-time modeling system 150 place data physically closer to the user for a lower latency. Any other type of storage platform or system may be envisioned to obtain and store the data.

In block 220, the real-time modeling system 150 aggregates the data to a configured format in a single database. The real-time modeling system 150 processes, characterizes, categorizes, or otherwise aggregates the data such that the data is usable to train machine learning processes, perform analysis of the user or the systems, or perform any other processes despite the multiple formats in which the data was received. When the real-time modeling system 150 stores the data, the data may be stored in the format in which the data was received and processed when needed. Alternatively, the data may be processed before storage.

In certain examples, the data is stored in a single database using a single format. However, in other examples, the data may be stored in multiple databases or in multiple formats. The real-time modeling system 150 stored the data in these multiple databases or formats and maintains immediate access to the data. Even though the data is in multiple databases or formats, the real-time modeling system 150 is able to easily access, compare, sort, characterize or otherwise process the data quickly and accurately. For example, certain types of data may not be able to be stored in the single format of other data. In such cases, the real-time modeling system 150 stores the data in a separate format but is still able to access the data for use in the methods described herein.

In an example, to process the data, the real-time modeling system 150 accesses the data in the particular format and converts the data to a uniform format. The uniform format may be any configured format that the real-time modeling system 150 uses to analyze data. For example, the real-time modeling system 150 may convert all data in a CSV format into a JSON format. The real-time modeling system 150 may convert all plain text data into a CSV format. The real-time modeling system 150 may convert all dates to a standard DD/MM/YYYY format. The real-time modeling system 150 may convert the formats using any reformatting process available. For example, an algorithm may be used to convert CSV values to JSON values. A base layer format may be used to store the data. A base layer format may be any selected format to which the data from any other format may be converted. For example, the base layer format may be a simple format with a fine level of granularity to which other formats, such as JSON or CSV, readily and accurately convert.

The real-time modeling system 150 may configure the base level of granularity of the data required for comparison. Each set of stored data may be reduced to the selected level of granularity and stored in a database or file. When stored at the configured level of granularity, the data are all in the same format and accessible by a fraud analysis tool.

The data may be categorized when stored. When processed, the features or content of the data may be categorized into categories such as interaction type, application source, file size, usernames, addresses, metadata content, received format, user birthday, or any other feature that may be recognized and categorized. The data may be stored in each category or otherwise tagged or logged with category designations.

In block 230, the real-time modeling system 150 analyzes the data using one or more machine learning algorithm of the machine learning system 153.

As described in the Machine Learning section below, the data stored by the data acquisition system 120 is used to train the machine learning algorithm to create predictive models of the actions, systems, locations, devices, requests, or any other characteristic of fraudulent and nonfraudulent user interactions.

The machine learning system 153 imports or otherwise receives the data from the data acquisition system 120, the real-time modeling system 150, and/or the fraud system 130. The data is fed into the machine learning algorithm or otherwise provided as training data to the machine learning algorithm. As described herein, the data is processed and categorized by the machine learning algorithm. For example, user interactions may be analyzed to extract particular data groups in each interaction, such as by extracting or categorizing them by interaction types, merchant categories, dates, data sources, applications used, account types managed, or any other categories. Further, the ML algorithm may also extract non-trivial characteristics linking the data. For example, the input data to a neural network eventually becomes weights used by equations in nodes. Therefore, the neural network "learns" indescribable patterns between inputs.

In an example, the machine learning algorithm determines relationships between actions taken by a user in an interaction and the types of actions that potentially lead to fraud. As described herein, different machine learning algorithms may be tested to determine which type of machine learning algorithm provides the most accurate predictions or results. For example, the results may be tested by comparing predicted results of applying different rule sets to user data to historical data in which users' actions led to a fraudulent activity. The machine learning algorithm may deploy the model or algorithm selected for usage in real time based on the results of the testing. The results of the usage may be fed back to the machine learning algorithm to allow for adjustments to the selected algorithm. As additional results are received from user interactions, the model may be adjusted to better fit the data and thus make more accurate predictions.

The details of the method to train the machine learning algorithm are described in greater detail in the Machine Learning section below. In the examples herein, different machine learning algorithms utilized may include, but are not limited to, support vector machines, naive Bayes, neural networks, gradient boosting machines, random forests, and an ensemble of multiple algorithms. These algorithms are discussed in greater detail below.

Based on the data associated with the user, the predictive model may be used to predict when user actions or conditions will lead to fraud. The machine learning algorithm may be based on any of the suitable machine learning or artificial intelligence processes described herein.

In block 240, the machine learning system 153 develops multiple rule sets to test new data for fraudulent content. After the machine learning algorithm has created one or more models, the machine learning system 153 may determine which rules, if applied, would have detected certain fraudulent users or fraudulent activity. In certain examples, multiple rules may be combined to be performed concurrently or sequentially to detect fraud. An entire tool kit of rules may be developed for different situations or conditions. The machine learning system 153 may identify which rules may be combined and which rules are not able to be combined. The kit of rules may be used in any mix-and-match fashion based on the types of conditions or user actions being analyzed.

The rules may be updated as additional data becomes available. For example, new techniques for fraudulent activities are constantly being developed by fraudulent actors. As each new fraudulent technique is identified, one or more rules may be added or modified to detect the technique. Additionally, the machine learning system 153 may identify potentially fraudulent activities or techniques that have not yet been used based on inferences made based on the data. That is, the machine learning system 153 may identify a security loophole in an application based on trends or commonalities of existing fraudulent techniques.

In the example, a rule may be developed that verifies if a user location is the same for multiple interactions that are occurring simultaneously. If the locations of the interactions are different, then the rule may identify at least one of the interactions as being fraudulent. In another example rule, if a user changes the address of the user to a location that is in a region with high fraud occurrences, then the action may be identified as potentially fraudulent. In another example rule, if a user is repeatedly entering incorrect user passwords and is unable to receive recovery emails, then the action may be fraudulent.

Much more complex rules and interactions of rules may be developed by the machine learning system 153. Because the creation of the fraud rules is performed by the machine learning algorithm based on data collected by the data acquisition system 120, human analysis or cataloging is not required. The process is performed automatically by the machine learning system 153 without human intervention, as described in the Machine Learning section below. The amount of data typically collected from the payment instrument institution, the third-party providers, and the other data sources includes thousands to tens of thousands of data items for each user. In examples, the total number of users may include all of the clients of an institution or an application, all of a cellular provider's clients, all of the users on a social network, or the users from any other third-party provider. Human intervention in the process is not useful or required because the amount of data is too great. A team of humans would not be able to catalog or analyze the data in any useful manner. In particular, the team of humans could not perform the analysis in the amount of time that is required to prevent new fraudulent techniques from being used. Interactions, such as responding to a request for access to a physical location, need to be performed in real time. For example, a commercial transaction may need an application of fraud rules in under 200 milliseconds to be useful for a real time transaction. Human analysis is utterly unusable in such a situation.

The rules may be applied to user models that are created by the machine learning system 153. The user models may be based on the actual users or may be generic models created to simulate users or groups of users. The user models may be created using any of the described machine learning algorithms or processes. The user models may be used to test or simulate rule applications to various conditions. For example, to test a set of rules, the machine learning system 153 may create a user model based on an actual user, simulate conditions or actions of the user in the model, and simulate an application of the rules. If the rules are able to accurately identify actions that will lead to fraud, then the rules may be determined to be useful rules for the particular circumstances.

In block 250, the real-time modeling system 150 acquires data associated with a pending user interaction. The user interaction may be any suitable interaction as described herein, such as a request for access, a data request, an account update, a transaction, a communication, or any other suitable interaction with an application, website, or any other function of a provider computing device 140.

The interaction may be conducted via the communication application 112 or other application or user interface function of the user computing device 110, as described herein. The provider computing device 140 provides the interaction details to the fraud system 130*a* and/or the real-time modeling system 150 before proceeding with the interaction to determine if the interaction might be fraudulent. In certain examples, every user interaction is provided for analysis, while in other examples, only certain types of user interactions are provided for analysis.

In the example, the fraud system, such as fraud system 130*a*, that is associated with the application or function with which the user is interacting receives the interaction details from the provider computing device 140 and communicates the interaction details to the real-time modeling system 150. In the example, the fraud system 130*a* is used to determine when interactions are allowed to proceed, so the fraud system 130*a* communicates the interaction details to the real-time modeling system 150 before performing a fraud analysis or applying any rules of the fraud system 130*a*. In another example, the provider computing device 140 provides the interaction details directly to the real-time modeling system 150 instead of, or in addition to, the fraud system 130*a*.

The interaction may require a real time response by the fraud system 130*a*. The fraud system 130*a* is required to obtain the fraud analysis while the user is awaiting a response to the interaction. For example, if the interaction is a request for access to a digital service, such as access to a database, then the response must be provided in a substantially real time, such as in under one second or under 500 milliseconds. In another example, if the interaction is a transaction, an approval for the transaction is typically required to be within 100 to 200 milliseconds.

Because of the limited time available to perform the analysis, the data must be provided to the real-time modeling system 150 immediately during the pendency of the user interaction. The data must be provided over a sufficiently fast connection using technology that will allow the data to be communicated to the real-time modeling system 150, be analyzed, and returned from the real-time modeling system 150 within the pendency of the user interaction.

The data associated with the interaction may be any data provided by the user computing device 110 from with the interaction is received. For example, the user computing device 110 may provide data such as the user account number, a type of device of the user computing device 110, a location of the user computing device 110, a user password, details of the interaction, or any other suitable data.

In block 260, the real-time modeling system 150 analyzes the acquired data associated with the user interaction to determine if the user interaction is potentially fraudulent in real-time. The real-time modeling system 150 processes the interaction to determine the type or category of the interaction. The real-time modeling system 150 determines if the interaction requires a fraud analysis based on the category of the interaction. In an example, the real-time modeling system 150 determines that a request for certain data from a database may require a fraud analysis while a simple communication to a second user may not require a fraud analysis.

The real-time modeling system 150 performs an analysis using the machine learning system 153. For example, the real-time modeling system 150 feeds the details of the interaction into a simulator or model based on the type of interaction. Using one or more of the algorithms described herein in the Machine Learning section below, the real-time modeling system 150 identifies characteristics of the interaction that may apply to a fraud analysis. In an example, the machine learning system 153 determines that the interaction has a location different than the location of a majority of the user interactions. In another example, the machine learning system 153 determines that the interaction is being performed on a particular device. In another example, the machine learning system 153 determines that the interaction is of a type that is frequently used by fraudulent actors. In another example, the machine learning system 153 determines that a combination of factors has an unseen connection that may indicate fraud. These unseen connections may not alone be indicative of fraud, but a combination that is not realistically observable by human analysis may provide a connection that indicates a potentially fraudulent interaction.

The real-time modeling system 150 selects one or more rule sets to apply to the acquired data based on the analysis of the user interaction to determine if the acquired data is potentially fraudulent. The machine learning system 153 selects one or more rules or rule sets that are more likely than other rules or rule sets to identify a suspected type of fraud in the pending interaction. The determination of the one or more sets of rules may be based on inferences or connections made by the machine learning system 153 that are not realistically observable by human analysts. For example, a set of rules may be selected from two seemingly unrelated sets of rules based on a machine learning determination that the two rules, in combination, produce a prediction of fraud that is statistically significant.

In an example, a user provides a request to transfer funds from one account to a second account. The user is accessing the account via a website instead of an application on the user computing device 110. The machine learning system 153 accesses any details related to the user, the request, the user computing device 110, the user account, the account to which the funds are being transferred, the location of the user, and any other suitable details related to the interaction. The machine learning system 153 compares the details to the models or algorithms that are constructed to monitor fraud in similar interactions. For example, the machine learning system 153 enters the details into an algorithm that models fraudulent activities for account fund transfers.

The machine learning system 153 identifies one or more rules that can be applied to the transaction to determine if fraud is likely. For example, one rule selected is a rule to determine an age of the user account. A second rule selected is a rule to determine if the location of the user computing device 110 is an expected location. A third rule selected is a rule to determine if the receiving account is an account with which the user has previously interacted. A fourth rule selected is a rule to determine if the holder of the receiving account has maintained the account longer than a configured threshold amount of time. Some identified rules may be seemingly unrelated to other selected rules, such as a rule that assesses language patterns used in the interaction.

By combining this set of disparate rules and any other suitable rules, the machine learning system 153 is able to determine a risk score for the interaction. The machine learning system 153 may set the risk score based on any scale or scoring system. For example, the interaction may be a pass or fail rating. In another example, the interaction is given a percentage likely to be fraud, such as 30% likely or 70% likely. In another example, the interaction is given a grade, such as A, B, C, D, or F. In another example, the interaction is given a text rating, such as unlikely to be fraudulent, somewhat likely, likely, very likely, or most likely. Any scoring or scale system may be used.

In another example, a same transfer of funds as described above is attempted by a second user, but the user is using a downloaded application on the user computing device 110 instead of a website on a web browser. This difference in the interaction may spark a different set of rules. For example, instead of using the rule that the location of the user computing device 110 is an expected location, the machine learning system 153 uses a rule that determines if the location is one that is associated with fraudulent actors.

As described herein, the mix-and-match of the rules is based on the machine learning analysis of the individual characteristics of the interaction.

In block 270, the real-time modeling system 150 provides a notification to a fraud system associated with the pending user interaction indicating a likelihood that the user interaction is fraudulent during the pendency of the user interaction. The real-time modeling system 150 notifies fraud system 130 that is associated with the pending interaction that the analysis has been performed and whether the interaction is potentially fraudulent. For example, if the interaction is a user request for access to a physical location, then the real-time modeling system 150 provides the notification to fraud system that determines if the user request is authorized. In the example, the associated fraud system may be fraud system 130*a*.

The risk score may be divided into levels, such as likely fraudulent, potentially fraudulent, possibly fraudulent, unlikely to be fraudulent, or any other levels. The risk score may be provided as a grade, such as A, B, C, D, or F, as a number from 0 to 100, or in any other format. The notification may also be provided to the user computing device 110, provider computing device 140, the data acquisition system 120, or any other device or system.

In block 280, the fraud system 130*a* incorporates the provided likelihood that the user interaction is fraudulent into a fraud analysis in real time during the user interaction. As described, fraud system 130*a* is an example of whichever fraud system 130*a-n* is associated with the pending interaction. The fraud system 130*a*

The fraud system 130*a* may use the provided likelihood that the user interaction is fraudulent in a determination of whether to allow the interaction. The fraud system 130*a* may elect to deny the interaction, such as by refusing a data request, refusing a transfer, denying a social media post, or in any other way refusing to conduct the interaction. The fraud system 130*a* may incorporate the likelihood into a set of rules or other algorithm used to determine if the interaction should be allowed.

For example, the fraud system 130*a* may have a rule that sets a threshold for the provided likelihood of fraud. If the likelihood of fraud is below the threshold, then the fraud system 130*a* may provide an approval of the interaction, or simply allow the interaction to proceed without providing any notification. In an example, when the fraud system 130*a* receives a score of 0-100 as the likelihood, any score over 50 will cause the interaction to be denied.

In another example, the fraud system 130*a* may use the likelihood as one factor in a series of factors used to determine if the interaction will be allowed. The fraud system 130*a* may use the provided likelihood of fraud in any suitable manner.

Because the identification of the users is performed by the machine learning algorithm based on data collected by the data acquisition system 120, human analysis or cataloging is not required. The process is performed automatically by the machine learning system 130 without human intervention, as described in the Machine Learning section below.

Machine Learning

Machine learning is a field of study within artificial intelligence that allows computers to learn functional relationships between inputs and outputs without being explicitly programmed.

The term "Artificial Intelligence" refers to a quantitative method, system, or approach ("techniques") that emulates human intelligence via computer programs. These can be used to make estimates, predictions, recommendations, or decisions in manners that go beyond classical statistical, mathematical, econometric, or financial approaches.

Machine learning is the subset of AI that derives representations or inferences from data without explicitly programming every parameter representation or computer step (for example, Random Forest or Artificial Neural Network based algorithm approaches). In contrast, AI techniques that are not members of the machine learning subset include techniques such as fuzzy logic, complex dependency parsing techniques for natural language processing.

Machine learning involves a module comprising algorithms that may learn from existing data by analyzing, categorizing, or identifying the data. Such machine-learning algorithms operate by first constructing a model from training data to make predictions or decisions expressed as outputs. In example embodiments, the training data includes data for one or more identified features and one or more outcomes, for example using user interaction histories and known fraudulent interactions to identify a fraudulent interaction. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression is highly dependent on choosing informative, discriminating, and independent features. Features may comprise numerical data, categorical data, time-series data, strings, graphs, or images.

In general, there are two categories of machine learning problems: classification problems and regression problems. Classification problems, also referred to as categorization problems, aim at classifying items into discrete category values. Training data teaches the classifying algorithm how to classify. In example embodiments, features to be categorized may include interaction data, which can be provided to the classifying machine learning algorithm and then placed into categories of, for example, interactions with provider X, requesting data type Y, from user computing device Z, at geolocation A, or using application B. Regression algorithms aim at quantifying and correlating one or more features. Training data teaches the regression algorithm how to correlate the one or more features into a quantifiable value.

Embedding

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, features such as geolocation can be mapped to vectors implemented in embedding methods. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, the methods herein are developed to identify meaningful portions of the vector and extract semantic meanings between that space.

Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use. In one aspect, the training data used to teach the machine learning module can comprise input data such as user interaction histories and known fraudulent interactions and the respective target output data such as whether one or more rules would be useful to identify a fraudulent interaction.

Unsupervised and Supervised Learning

In an example embodiment, unsupervised learning is implemented. Unsupervised learning can involve providing all or a portion of unlabeled training data to a machine learning module. The machine learning module can then determine one or more outputs implicitly based on the provided unlabeled training data. In an example embodiment, supervised learning is implemented. Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

Semi-Supervised and Reinforcement Learning

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value and the machine learning module is developed to maximize the numerical value of the reward signal. In addition, reinforcement learning can adopt a value function that provides a numerical value representing an expected total of the numerical values provided by the reward signal over time.

Transfer Learning

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pre-trained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

Incremental and Curriculum Learning

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

Learning to Learn

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

Contrastive Learning

In example embodiment, contrastive learning is implemented. Contrastive learning is a self-supervised model of learning in which training data is unlabeled is considered as a form of learning in-between supervised and unsupervised learning. This method learns by contrastive loss, which separates unrelated (i.e., negative) data pairs and connects related (i.e., positive) data pairs. For example, to create positive and negative data pairs, more than one view of a datapoint, such as rotating an image or using a different time-point of a video, is used as input. Positive and negative pairs are learned by solving dictionary look-up problem. The two views are separated into query and key of a dictionary. A query has a positive match to a key and negative match to all other keys. The machine learning module then learns by connecting queries to their keys and separating queries from their non-keys. A loss function, such as those described herein, is used to minimize the distance between positive data pairs (e.g., a query to its key) while maximizing the distance between negative data points. See e.g., Tian, Yonglong, et al. "What makes for good views for contrastive learning?" Advances in Neural Information Processing Systems 33 (2020): 6827-6839. Pre-Trained Learning In example embodiments, the machine learning module is pre-trained. A pre-trained machine learning model is a model that has been previously trained to solve a similar problem. The pre-trained machine learning model is generally pre-trained with similar input data to that of the new problem. A pre-trained machine learning model further trained to solve a new problem is generally referred to as transfer learning, which is described herein. In some instances, a pre-trained machine learning model is trained on a large dataset of related information. The pre-trained model is then further trained and tuned for the new problem. Using a pre-trained machine learning module provides the advantage of building a new machine learning module with input neurons/nodes that are already familiar with the input data and are more readily refined to a particular problem. See e.g., Diamant N, et al. Patient contrastive learning: A performant, expressive, and practical approach to electrocardiogram modeling. PLOS Comput Biol. 2022 Feb. 14;18(2):e1009862.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, produce, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results. In example embodiments, input data can comprise user interaction histories and known fraudulent interactions and, when provided to a trained machine learning module, results in output data such as whether one or more rules would be useful to identify a fraudulent interaction. The output can then be provided to the incentive system to use in determining what rules to apply to pending transactions.

Algorithms

Different machine-learning algorithms have been contemplated to carry out the embodiments discussed herein. For example, linear regression (LiR), logistic regression (LoR), Bayesian networks (for example, naive-bayes), random forest (RF) (including decision trees), neural networks (NN) (also known as artificial neural networks), matrix factorization, a hidden Markov model (HMM), support vector machines (SVM), K-means clustering (KMC), K-nearest neighbor (KNN), a suitable statistical machine learning algorithm, and/or a heuristic machine learning system for classifying or evaluating whether one or more rules would be useful to identify a fraudulent interaction.

The methods described herein can be implemented with more than one machine learning method. The machine learning system can use a combination of machine learning algorithms. The machine learning algorithms may be of the same type or of different types. For example, a first machine learning algorithm may be trained for a first type of result, while a second machine learning algorithm may be trained for a second type of result. In certain examples, the first type of result may be an input into the second machine learning algorithm, while in other examples, the two results are combined to produce a third result. In certain examples, the first and second types of results are both inputs into a third machine learning algorithm that produces the third result.

Linear Regression (LiR)

In one example embodiment, linear regression machine learning is implemented. LiR is typically used in machine learning to predict a result through the mathematical relationship between an independent and dependent variable. A simple linear regression model would have one independent variable (x) and one dependent variable (y). A representation of an example mathematical relationship of a simple linear regression model would be y=mx+b. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem preposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved. In example embodiments, user interaction histories and known fraudulent interactions are used as the independent variables to train a LiR machine learning module, which, after training, is used to estimate, for example, whether one or more rules would be useful to identify a fraudulent interaction.

Logistic Regression (LoR)

In one example embodiment, logistic regression machine learning is implemented. Logistic Regression, often considered a LiR type model, is typically used in machine learning to classify information, such as user interaction histories and known fraudulent interactions into categories such as whether one or more rules would be useful to identify a fraudulent interaction. LoR takes advantage of probability to predict an outcome from input data. However, what makes LoR different from a LiR is that LoR uses a more complex logistic function, for example a sigmoid function. In addition, the cost function can be a sigmoid function limited to a result between 0 and 1. For example, the sigmoid function can be of the form $f(x)=1/(1+e^{-*})$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process. In example embodiments, user interaction histories and known fraudulent interactions are used as the independent variables to train a LoR machine learning module, which, after training, is used to estimate, for example, one or more rules would be useful to identify a fraudulent interaction.

Bayesian Network

In one example embodiment, a Bayesian Network is implemented. BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node the probability of the input features resulting in the connected node is learned and forms the predictive mechanism. The nodes may comprise the same, similar or different probability functions to determine movement from one node to another. The nodes of a Bayesian network are conditionally independent of its non-descendants given its parents thus satisfying a local Markov property. This property affords reduced computations in larger networks by simplifying the joint distribution.

There are multiple methods to evaluate the inference, or predictability, in a BN but only two are mentioned for demonstrative purposes. The first method involves computing the joint probability of a particular assignment of values for each variable. The joint probability can be considered the product of each conditional probability and, in some instances, comprises the logarithm of that product. The second method is Markov chain Monte Carlo (MCMC), which can be implemented when the sample size is large. MCMC is a well-known class of sample distribution algorithms and will not be discussed in detail herein.

The assumption of conditional independence of variables forms the basis for Naïve Bayes classifiers. This assumption implies there is no correlation between different input features. As a result, the number of computed probabilities is significantly reduced as well as the computation of the probability normalization. While independence between features is rarely true, this assumption exchanges reduced computations for less accurate predictions, however the predictions are reasonably accurate. In example embodiments, user interaction histories and known fraudulent interactions are mapped to the BN graph to train the BN machine learning module, which, after training, is used to estimate whether one or more rules would be useful to identify a fraudulent interaction.

Random Forest

In one example embodiment, random forest ("RF") is implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets. In example embodiments, user interaction histories and known fraudulent interactions are used to train the nodes of the decision trees of a RF machine learning module, which, after training, is used to estimate whether one or more rules would be useful to identify a fraudulent interaction.

Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding underperforming nodes are then modified in the new tree to improve their accuracy. This process is performed iteratively until the accuracy of the model has reached a defined threshold or a defined limit of trees has been reached. Less accurate nodes are identified by the gradient of a loss function. Loss functions must be differentiable such as a linear or logarithmic functions. The modified node weights in the new tree are selected to minimize the gradient of the loss function. In an example embodiment, a decision tree is implemented to determine user interaction histories and fraudulent interactions and gradient boosting is applied to the tree to improve its ability to accurately determine whether one or more rules would be useful to identify a fraudulent interaction.

Neural Networks

In one example embodiment, Neural Networks are implemented. NNs are a family of statistical learning models influenced by biological neural networks of the brain. NNs can be trained on a relatively-large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Similar to the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN for user interaction histories and known fraudulent interactions is defined by a set of input neurons that can be given input data such as user interaction histories and known fraudulent interactions. The input neuron weighs and transforms the input data and passes the result to other neurons, often referred to as "hidden" neurons. This is repeated until an output neuron is activated. The activated output neuron produces a result. In example embodiments, user transaction histories and secondary user actions or data are used to train the neurons in a NN machine learning module, which, after training, is used to estimate whether one or more rules would be useful to identify a fraudulent interaction.

Convolutional Autoencoder

In example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning. In example embodiments, the convolutional autoencoder is a variational convolutional autoencoder. In example embodiments, features from a user interaction histories and known fraudulent interactions are used as an input signal into a CAE which reconstructs that signal into an output such as a whether one or more rules would be useful to identify a fraudulent interaction.

Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. In example embodiments, user interaction histories and known fraudulent interactions are used to train the neurons of a deep learning module, which, after training, is used to estimate whether one or more rules would be useful to identify a fraudulent interaction.

Convolutional Neural Network (CNN)

In an example embodiment, a convolutional neural network is implemented. CNNs is a class of NNs further attempting to replicate the biological neural networks, but of the animal visual cortex. CNNs process data with a grid pattern to learn spatial hierarchies of features. Wherein NNs are highly connected, sometimes fully connected, CNNs are connected such that neurons corresponding to neighboring data (e.g., pixels) are connected. This significantly reduces the number of weights and calculations each neuron must perform.

In general, input data, such as user interaction histories and known fraudulent interactions, comprises of a multidimensional vector. A CNN, typically, comprises of three layers: convolution, pooling, and fully connected. The convolution and pooling layers extract features and the fully connected layer combines the extracted features into an output, such as whether user interaction histories and known fraudulent interactions would be useful to identify a fraudulent interaction.

In particular, the convolutional layer comprises of multiple mathematical operations such as of linear operations, a specialized type being a convolution. The convolutional layer calculates the scalar product between the weights and the region connected to the input volume of the neurons. These computations are performed on kernels, which are reduced dimensions of the input vector. The kernels span the entirety of the input. The rectified linear unit (i.e., ReLu) applies an elementwise activation function (e.g., sigmoid function) on the kernels.

CNNs can optimized with hyperparameters. In general, there three hyperparameters are used: depth, stride, and zero-padding. Depth controls the number of neurons within a layer. Reducing the depth may increase the speed of the CNN but may also reduce the accuracy of the CNN. Stride determines the overlap of the neurons. Zero-padding controls the border padding in the input.

The pooling layer down-samples along the spatial dimensionality of the given input (i.e., convolutional layer output), reducing the number of parameters within that activation. As an example, kernels are reduced to dimensionalities of 2×2 with a stride of 2, which scales the activation map down to 25%. The fully connected layer uses inter-layer-connected neurons (i.e., neurons are only connected to neurons in other layers) to score the activations for classification and/or regression. Extracted features may become hierarchically more complex as one layer feeds its output into the next layer. See O'Shea, K.; Nash, R. An Introduction to Convolutional Neural Networks. arXiv 2015 and Yamashita, R., et al Convolutional neural networks: an overview and application in radiology. Insights Imaging 9, 611-629 (2018).

Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. For example, input such as is received by a RNN, which determines whether one or more rules would be useful to identify a fraudulent interaction. See Sherstinsky, Alex. "Fundamentals of recurrent neural network (RNN) and long short-term memory (LSTM) network." Physica D: Nonlinear Phenomena 404 (2020): 132306.

Long Short-Term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tanh, and RELU. Sec Zhu, Xiaodan, et al. "Long short-term memory over recursive structures." International Conference on Machine Learning. PMLR, 2015.

Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features and the second matrix Z contains the known output of the training input features. First the dot product of R and X are computed and the square mean error, as one example method, of the result is estimated. The values in R are modulated and the process is repeated in a gradient descent style approach until the error is appropriately minimized. The trained matrix R is then used in the machine learning model. In example embodiments, user interaction histories and known fraudulent interactions are used to train the relationship matrix R in a matrix factorization machine learning module. After training, the relationship matrix R and input matrix F, which comprises vector representations of user interaction histories and known fraudulent interactions, results in the prediction matrix P comprising whether one or more rules would be useful to identify a fraudulent interaction.

Hidden Markov Model

In example embodiments, a hidden Markov model is implemented. A HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. A HMM comprises a network of connected nodes. Traversing the network is dependent on three model parameters: start probability; state transition probabilities; and observation probability. The start probability is a variable that governs, from the input node, the most plausible consecutive state. From there each node i has a state transition probability to node j. Typically the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix $N_{oj}$ wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences. In example embodiments, user transaction histories and geolocations are used to train the nodes/states of the HMM machine learning module, which, after training, is used to estimate whether one or more rules would be useful to identify a fraudulent interaction.

Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of a SVM. The dimensionality of a hyperplane depends on the number of input features. For example, a SVM with two input features will have a linear (1-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal. In example embodiments, user interaction histories and known fraudulent interactions are used to train the linear equation or kernel function of the SVM machine learning module, which, after training, is used to estimate whether one or more rules would be useful to identify a fraudulent interaction.

K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised. In example embodiments, user interaction histories and known fraudulent interactions are used to train the centroids of a KMC machine learning module, which, after training, is used to estimate whether one or more rules would be useful to identify a fraudulent interaction.

K-Nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "outvoting" near neighbors of another class. In one example embodiment, k is 1 and a Markov model approach is utilized. In example embodiments, user transaction histories and geolocations are used to train a KNN machine learning module, which, after training, is used to estimate whether one or more rules would be useful to identify a fraudulent interaction.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the module described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications so as to allow the applications to share and access common data.

Multimodal Translation

In an example embodiment, the machine learning module comprises multimodal translation (MT), also known as multimodal machine translation or multimodal neural machine translation. MT comprises of a machine learning module capable of receiving multiple (e.g. two or more) modalities. Typically, the multiple modalities comprise of information connected to each other.

In example embodiments, the MT may comprise of a machine learning method further described herein. In an example embodiment, the MT comprises a neural network, deep neural network, convolutional neural network, convolutional autoencoder, recurrent neural network, or an LSTM. For example, one or more microscopy imaging data comprising multiple modalities from a subject is embedded as further described herein. The embedded data is then received by the machine learning module. The machine learning module processes the embedded data (e.g. encoding and decoding) through the multiple layers of architecture then determines the corresponding the modalities comprising the input. The machine learning methods further described herein may be engineered for MT wherein the inputs described herein comprise of multiple modalities. See e.g. Sulubacak, U., Caglayan, O., Grönroos, SA. et al. Multimodal machine translation through visuals and speech. Machine Translation 34, 97-147 (2020) and Huang, Xun, et al. "Multimodal unsupervised image-to-image translation." Proceedings of the European conference on computer vision (ECCV). 2018.

The ladder diagrams, scenarios, flowcharts and block diagrams in the figures and discussed herein illustrate architecture, functionality, and operation of example embodiments and various aspects of systems, methods, and computer program products of the present invention. Each block in the flowchart or block diagrams can represent the processing of information and/or transmission of information corresponding to circuitry that can be configured to execute the logical functions of the present techniques. Each block in the flowchart or block diagrams can represent a module, segment, or portion of one or more executable instructions for implementing the specified operation or step. In example embodiments, the functions/acts in a block can occur out of the order shown in the figures and nothing requires that the operations be performed in the order illustrated. For example, two blocks shown in succession can executed concurrently or essentially concurrently. In another example, blocks can be executed in the reverse order. Furthermore, variations, modifications, substitutions, additions, or reduction in blocks and/or functions may be used with any of the ladder diagrams, scenarios, flow charts and block diagrams discussed herein, all of which are explicitly contemplated herein.

The ladder diagrams, scenarios, flow charts and block diagrams may be combined with one another, in part or in whole. Coordination will depend upon the required functionality. Each block of the block diagrams and/or flowchart illustration as well as combinations of blocks in the block diagrams and/or flowchart illustrations can be implemented by special purpose hardware-based systems that perform the aforementioned functions/acts or carry out combinations of special purpose hardware and computer instructions. Moreover, a block may represent one or more information transmissions and may correspond to information transmissions among software and/or hardware modules in the same physical device and/or hardware modules in different physical devices.

The present techniques can be implemented as a system, a method, a computer program product, digital electronic circuitry, and/or in computer hardware, firmware, software, or in combinations of them. The system may comprise distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors.

Example Computing Device

FIG. 3 depicts a block diagram of a computing machine 2000 and a module 2050 in accordance with certain examples. The computing machine 2000 may comprise, but is not limited to, remote devices, work stations, servers, computers, general purpose computers, Internet/web appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and any machine capable of executing the instructions. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The one or more embodiments of processor 2010 may be configured to execute code or instructions to perform the operations and functionality described herein, manage request flow and address mappings, and to perform calculations and generate commands. Such code or instructions could include, but is not limited to, firmware, resident software, microcode, and the like. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), tensor processing units (TPUs), a graphics processing unit ("GPU"), a field programmable gate array ("FPGA"), a programmable logic device ("PLD"), a radio-frequency integrated circuit (RFIC), a controller, a state machine, gated logic, discrete hardware components, any other processing unit, or any combination or multiplicity thereof. In example embodiments, each processor 2010 can include a reduced instruction set computer (RISC) microprocessor. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines. Processors 2010 are coupled to system memory and various other components via a system bus 2020.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random-access memory ("RAM"), static random-access memory ("SRAM"), dynamic random-access memory ("DRAM"), and synchronous dynamic random-access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 is coupled to system bus 2020 and can include a basic input/output system (BIOS), which controls certain basic functions of the processor 2010 and/or operate in conjunction with, a non-volatile storage device such as the storage media 2040.

In example embodiments, the computing device 2000 includes a graphics processing unit (GPU) 2090. Graphics processing unit 2090 is a specialized electronic circuit designed to manipulate and alter memory to accelerate the creation of images in a frame buffer intended for output to a display. In general, a graphics processing unit 2090 is efficient at manipulating computer graphics and image processing and has a highly parallel structure that makes it more effective than general-purpose CPUs for algorithms where processing of large blocks of data is done in parallel.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any electromagnetic storage device, any semiconductor storage device, any physical-based storage device, any removable and non-removable media, any other data storage device, or any combination or multiplicity thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The module 2050 may comprise one or more hardware or software elements, as well as an operating system, configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. Each of the operating system, one or more application programs, other program modules, and program data or some combination thereof, may include an implementation of a networking environment. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for coupling in operation the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including cursor control devices, touch-screens, scanners, electronic digitizers, sensors, receivers, touchpads, trackballs, cameras, microphones, alphanumeric input devices, any other pointing devices, or any combinations thereof. The I/O interface 2060 may couple the computing machine 2000 to various output devices including video displays (The computing device 2000 may further include a graphics display, for example, a plasma display panel (PDP), a light emitting diode (LED) display, a liquid crystal display (LCD), a projector, a cathode ray tube (CRT), or any other display capable of displaying graphics or video), audio generation device, printers, projectors, tactile feedback devices, automation control, robotic components, actuators, motors, fans, solenoids, valves, pumps, transmitters, signal emitters, lights, and so forth. The I/O interface 2060 may couple the computing device 2000 to various devices capable of input and out, such as a storage unit. The devices can be interconnected to the system bus 2020 via a user interface adapter, which can include, for example, a Super I/O chip integrating multiple device adapters into a single integrated circuit.

The computing machine 2000 may operate in a networked environment using logical connections through the network interface 2070 to one or more other systems or computing machines across the network 2080. The network 2080 may include a local area network ("LAN"), a wide area network ("WAN"), an intranet, an Internet, a mobile telephone network, storage area network ("SAN"), personal area network ("PAN"), a metropolitan area network ("MAN"), a wireless network ("WiFi;"), wireless access networks, a wireless local area network ("WLAN"), a virtual private network ("VPN"), a cellular or other mobile communication network, Bluetooth, near field communication ("NFC"), ultra-wideband, wired networks, telephone networks, optical networks, copper transmission cables, or combinations thereof or any other appropriate architecture or system that facilitates the communication of signals and data. The network 2080 may be packet switched, circuit switched, of any topology, and may use any communication protocol. The network 2080 may comprise routers, firewalls, switches, gateway computers and/or edge servers. Communication links within the network 2080 may involve various digital or analog communication media such as fiber optic cables, free-space optics, waveguides, electrical conductors, wireless links, antennas, radio-frequency communications, and so forth.

Information for facilitating reliable communications can be provided, for example, as packet/message sequencing information, encapsulation headers and/or footers, size/time information, and transmission verification information such as cyclic redundancy check (CRC) and/or parity check values. Communications can be made encoded/encrypted, or otherwise made secure, and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure and then decrypt/decode communications.

The processor 2010 may be connected to the other elements of the computing machine 2000 or the various peripherals discussed herein through the system bus 2020. The system bus 2020 represents one or more of any of several types of bus structures, including a memory bus or memory controller, a peripheral bus, an accelerated graphics port, and a processor or local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those ordinarily skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

A "server" may comprise a physical data processing system (for example, the computing device 2000 as shown in FIG. 3) running a server program. A physical server may or may not include a display and keyboard. A physical server may be connected, for example by a network, to other computing devices. Servers connected via a network may operate in the capacity of a server machine or a client machine in a server-client network environment, or as a peer machine in a distributed (e.g., peer-to-peer) network environment. The computing device 2000 can include clients' servers. For example, a client and server can be remote from each other and interact through a network. The relationship of client and server arises by virtue of computer programs in communication with each other, running on the respective computers.

The example systems, methods, and acts described in the examples and described in the figures presented previously are illustrative, not intended to be exhaustive, and not meant to be limiting. In alternative examples, certain acts can be performed in a different order, in parallel with one another, omitted entirely, and/or combined between different examples, and/or certain additional acts can be performed, without departing from the scope and spirit of various examples. Plural instances may implement components, operations, or structures described as a single instance. Structures and functionality that may appear as separate in example embodiments may be implemented as a combined structure or component. Similarly, structures and functionality that may appear as a single component may be implemented as separate components. Accordingly, such alternative examples are included in the scope of the following claims, which are to be accorded the broadest interpretation to encompass such alternate examples. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for using user-specific parameters to detect malicious activity in an interaction, the system comprising:
   a storage device; and
   one or more processors communicatively coupled to the storage device storing instructions thereon, that cause the one or more processors to:
   receive user action data representing user actions for a plurality of users relative to a plurality of applications;
   extract, from the user action data, first user action data representing first user actions of a first user of the plurality of users;
   generate, using the first user action data and without using other user action data representing other user actions for other users of the plurality of users, a plurality of parameters specific to the first user for determining whether interactions of the first user represent malicious activity, wherein each parameter of the plurality of parameters comprises a corresponding parameter identifier and a corresponding parameter value;
   receive, for the first user, a request for a pending interaction with a particular application of the plurality of applications;
   input, into a first user model, the pending interaction to cause the first user model to generate a plurality of parameter identifiers identifying a set of parameters within the plurality of parameters, wherein the set of parameters is more likely than another set of parameters within the plurality of parameters to identify the malicious activity, and wherein the first user model is trained for the first user using the first user action data and without using the other user action data; and
   during pendency of the pending interaction;
   determine, for the set of parameters, a corresponding set of interaction parameters, wherein the corresponding set of interaction parameters is extracted from the pending interaction that is received as part of the request;
   determine whether the corresponding set of interaction parameters matches the set of parameters; and
   based on determining that the corresponding set of interaction parameters matches the set of parameters, determine that the pending interaction is malicious.

2. The system of claim 1, wherein the instructions for generating the plurality of parameters specific to the first user further cause the one or more processors to:
   input, into a parameter generating machine learning model, the first user action data to cause the parameter generating machine learning model to generate the plurality of parameters specific to the first user, wherein the parameter generating machine learning model is trained to generate user-specific parameters based on particular user action data relating to a particular user; and
   receive, from the parameter generating machine learning model, the plurality of parameters.

3. The system of claim 1, wherein the instructions further cause the one or more processors to:
   determine that the first user model corresponds to the first user of the plurality of users; and
   provide, to the first user model, the first user action data without providing the other user action data to train the first user model to generate parameter identifiers identifying sets of parameters for the first user based on pending interactions.

4. The system of claim 1, wherein the instructions further cause the one or more processors to:
   receive, from the first user model, the plurality of parameter identifiers identifying the set of parameters; and
   extract, from parameter storage using the plurality of parameter identifiers, the set of parameters associated with the first user of the plurality of users, wherein the parameter storage stores the plurality of parameters specific to the first user and other pluralities of parameters associated with other users.

5. The system of claim 4, wherein the instructions further cause the one or more processors to:
   determine that a number of parameters within the set of parameters matches the corresponding set of interaction parameters;
   determine a ratio of the number of parameters that matches the corresponding set of interaction parameters to a total number of parameters of the set of parameters; and
   based on determining that the ratio satisfies a threshold ratio, determine that the pending interaction is malicious.

6. The system of claim 5, wherein the instructions further cause the one or more processors to reject the pending interaction based on determining that the pending interaction is malicious.

7. The system of claim 1, wherein the instructions further cause the one or more processors to:
   extract, from the user action data, second user action data representing second user actions of a second user of the plurality of users;
   generate, using a parameter generating machine learning model with the second user action data, a new plurality of parameters specific to the second user for determining whether interactions of the second user represent new malicious activity, wherein the parameter generating machine learning model is trained to generate user-specific parameters based on particular user action data relating to a particular user;
   receive, for the second user, a new request for a new pending interaction with an application of the plurality of applications;
   input, into a second user model, the pending interaction to cause the second user model to generate a new plurality of parameter identifiers identifying a new set of parameters within the new plurality of parameters, wherein the second user model is trained for the second user using the second user action data and without using the other user action data;
   perform, in real time during pendency of the new pending interaction, a new comparison between a new plurality of corresponding parameter values associated with the new set of parameters and one or more new interaction values associated with the new pending interaction; and
   generate, based on the new comparison and in real time during the pendency of the new pending interaction, a new output indicating a new likelihood that the new request represents the new malicious activity.

8. A method comprising:
   receiving user action data representing user actions for a plurality of users relative to a plurality of applications;
   generating, using first user action data representing first user actions of a first user of the plurality of users, a plurality of parameters specific to the first user for determining whether interactions of the first user represent malicious activity, wherein each parameter of the plurality of parameters comprises a corresponding parameter identifier and a corresponding parameter value;

receiving, for the first user, a request for a pending interaction with a particular application of the plurality of applications;

inputting, into a first user model, the pending interaction to cause the first user model to generate a plurality of parameter identifiers identifying a set of parameters within the plurality of parameters, wherein the set of parameters is more likely than another set of parameters within the plurality of parameters to identify the malicious activity, wherein the first user model is trained for the first user using the first user action data; and during pendency of the pending interaction; using determining, for the set of parameters, a corresponding set of interaction parameters, wherein the corresponding set of interaction parameters is extracted from the pending interaction that is received as part of the request;

determining whether the corresponding set of interaction parameters matches the set of parameters; and based on determining that the corresponding set of interaction parameters matches the set of parameters, determining that the pending interaction is malicious.

9. The method of claim 8, wherein generating the plurality of parameters specific to the first user further comprises:

inputting, into a parameter generating machine learning model, the first user action data to cause the parameter generating machine learning model to generate the plurality of parameters specific to the first user for determining whether interactions of the first user represent malicious activity, wherein the parameter generating machine learning model is trained to generate user-specific parameters based on particular user action data relating to a particular user; and receiving, from the parameter generating machine learning model, the plurality of parameters.

10. The method of claim 8, further comprising:

determining that the first user model corresponds to the first user of the plurality of users; and providing, to the first user model, the first user action data without providing other user action data to train the first user model to generate parameter identifiers identifying sets of parameters for the first user based on pending interactions.

11. The method of claim 8, wherein validating the request comprises:

performing, in real time during pendency of the pending interaction, a comparison between a plurality of corresponding parameter values associated with the set of parameters and one or more interaction values associated with the pending interaction; and generating, based on the comparison and in real time during the pendency of the pending interaction, an output indicating a likelihood that the request represents the malicious activity.

12. The method of claim 8, further comprising:

receiving, from the first user model, the plurality of parameter identifiers identifying the set of parameters; and extracting, from parameter storage using the plurality of parameter identifiers, the set of parameters associated with the first user of the plurality of users, wherein the parameter storage stores the plurality of parameters specific to the first user and other pluralities of parameters associated with other users.

13. The method of claim 12, further comprising:

determining that the pending interaction is malicious; and based on determining that the pending interaction is malicious, rejecting the pending interaction.

14. One or more non-transitory, computer-readable media storing instructions that, when executed by one or more processors, cause operations comprising:

receiving user action data representing user actions for a plurality of users relative to a plurality of applications;

generating, using first user action data representing first user actions of a first user of the plurality of users, a plurality of parameters specific to the first user for determining whether interactions of the first user represent malicious activity, wherein each parameter of the plurality of parameters comprises a corresponding parameter identifier and a corresponding parameter value;

receiving, for the first user, a request for a pending interaction with a particular application of the plurality of applications;

inputting, into a first user model, the pending interaction to cause the first user model to generate a plurality of parameter identifiers identifying a set of parameters within the plurality of parameters, wherein the set of parameters is more likely than another set of parameters within the plurality of parameters to identify the malicious activity, wherein the first user model is trained for the first user using the first user action data; and during pendency of the pending interaction;

determining, for the set of parameters, a corresponding set of interaction parameters, wherein the corresponding set of interaction parameters is extracted from the pending interaction that is received as part of the request;

determining whether the corresponding set of interaction parameters matches the set of parameters; and based on determining that the corresponding set of interaction parameters matches the set of parameters, determining that the pending interaction is malicious.

15. The one or more non-transitory, computer-readable media of claim 14, wherein generating the plurality of parameters specific to the first user further comprises:

inputting, into a parameter generating machine learning model, the first user action data to cause the parameter generating machine learning model to generate the plurality of parameters specific to the first user for determining whether interactions of the first user represent malicious activity, wherein the parameter generating machine learning model is trained to generate user-specific parameters based on particular user action data relating to a particular user; and receiving, from the parameter generating machine learning model, the plurality of parameters.

16. The one or more non-transitory, computer-readable media of claim 14, further comprising:

receiving, from the first user model, the plurality of parameter identifiers identifying the set of parameters; and extracting, from parameter storage using the plurality of parameter identifiers, the set of parameters associated with the first user of the plurality of users, wherein the parameter storage stores the plurality of parameters specific to the first user and other pluralities of parameters associated with other users.

17. The one or more non-transitory, computer-readable media of claim 16, further comprising:
determining that the pending interaction is malicious; and
based on determining that the pending interaction is malicious, rejecting the pending interaction.

* * * * *